(12) United States Patent
Tseng et al.

(10) Patent No.: US 11,013,988 B2
(45) Date of Patent: May 25, 2021

(54) GAME GRIP

(71) Applicant: Cheng Uei Precision Industry Co., Ltd., New Taipei (TW)

(72) Inventors: Chi Ming Tseng, New Taipei (TW); Tsung Shih Lee, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 16/823,688

(22) Filed: Mar. 19, 2020

(65) Prior Publication Data

US 2021/0060417 A1 Mar. 4, 2021

(30) Foreign Application Priority Data

Sep. 4, 2019 (CN) .......................... 201921464989.6

(51) Int. Cl.
*A63F 13/24* (2014.01)
*A63F 13/218* (2014.01)

(52) U.S. Cl.
CPC ............ *A63F 13/24* (2014.09); *A63F 13/218* (2014.09); *A63F 2300/1043* (2013.01); *A63F 2300/1056* (2013.01)

(58) Field of Classification Search
CPC .... A63F 13/24; A63F 13/218; A63F 2300/06; A63F 2300/1043; A63F 2300/1056; G06F 3/0383; G06F 3/0421
See application file for complete search history.

(56) References Cited

U.S. PATENT DOCUMENTS

| | | | |
|---|---|---|---|
| D462,393 S * | 9/2002 | Ku ............................... | D14/401 |
| 6,512,511 B2 * | 1/2003 | Willner .................... | A63F 13/06 345/169 |
| D470,192 S * | 2/2003 | Ku .............................. | D14/454 |
| 7,345,670 B2 * | 3/2008 | Armstrong .............. | A63F 13/06 345/156 |
| 8,834,278 B2 * | 9/2014 | Longman .............. | G06F 3/0338 463/43 |
| D865,766 S * | 11/2019 | Hu ............................... | D14/401 |
| 2005/0219355 A1 * | 10/2005 | Tahara .................... | G06F 3/033 348/14.05 |
| 2007/0049374 A1 * | 3/2007 | Ikeda ..................... | A63F 13/213 463/30 |
| 2008/0146336 A1 * | 6/2008 | Feldman ................. | A63F 13/24 463/37 |
| 2010/0245239 A1 * | 9/2010 | Sternberg .............. | A63F 13/218 345/156 |
| 2014/0139433 A1 * | 5/2014 | Choi ..................... | G06F 3/0383 345/158 |

(Continued)

*Primary Examiner* — Reginald A Renwick
(74) *Attorney, Agent, or Firm* — Lin & Associates Intellectual Property, Inc.

(57) ABSTRACT

A game grip includes a cover body, a grip shell, a pressure sensor, a buffer material element, a sliding mechanism and an elastic mechanism. An outer surface of the cover body is recessed inward to form an accommodating surface. The grip shell is covered to the accommodating surface. The pressure sensor is disposed to the accommodating surface. The buffer material element is disposed to the grip shell. The buffer material element is disposed corresponding to the pressure sensor. The sliding mechanism is disposed between the cover body and the grip shell. The elastic mechanism abuts between the accommodating surface of the cover body and the grip shell.

12 Claims, 15 Drawing Sheets

(56) References Cited

U.S. PATENT DOCUMENTS

| | | | | |
|---|---|---|---|---|
| 2016/0361634 A1* | 12/2016 | Gassoway | ............... | A63F 13/22 |
| 2017/0354872 A1* | 12/2017 | Suetake | .................. | A63F 13/24 |
| 2017/0361222 A1* | 12/2017 | Tsuchiya | ................. | A63F 13/24 |
| 2018/0158627 A1* | 6/2018 | Morita | ................ | A63F 13/2145 |
| 2018/0333641 A1* | 11/2018 | Strahle | .................... | A63F 13/24 |
| 2019/0270006 A1* | 9/2019 | Guerrero, Jr. | ............ | G05G 5/04 |

* cited by examiner

GAME GRIP

CROSS-REFERENCE TO RELATED APPLICATION

The present application is based on, and claims priority from, China Patent Application No. 201921464989.6, filed Sep. 4, 2019, the disclosure of which is hereby incorporated by reference herein in its entirety.

BACKGROUND OF THE INVENTION

1. Field of the Invention

The present invention generally relates to a game grip, and more particularly to a game grip having a lower manufacturing cost.

2. The Related Art

Nowadays, a proportion of games are bigger and bigger in people's leisure activities. With the rise of video game industries, a conventional game grip is used in playing a video game, a control method of the conventional game grip is developed in diversification for increasing an operability and an entertainment of the video game.

Generally, a model of the conventional game grip has multiple curve surfaces, continuous activities of multiple mechanisms need be considered in structure design, and a reserved space need be considered for making a gap formed between a sensing mechanism and a soft pressure sensing element of the conventional game grip. When the conventional game grip is operated in hand, the soft pressure sensing element will be without being easily touched. The soft pressure sensing element will be pressed at the time of a player exerting a force on the soft pressure sensing element of the conventional game grip. Otherwise, a sensing structure of an outer shell of the conventional game grip will be easily touched at the time of the player playing the game to touch the soft pressure sensing element. The soft pressure sensing element is soft and quite sensitive, just a little dimension value difference will make the soft pressure sensing element have more value differences.

However, an inner space of the conventional game grip just has a foam pad, and the foam pad with an elastic characteristic is filled in the gap formed between the sensing mechanism and the soft pressure sensing element of the conventional game grip for preventing the sensing mechanism and the soft pressure sensing element directly being touched with each other, and the soft pressure sensing element will be pressed at the time of the player exerting the force on the soft pressure sensing element of the conventional game grip, and in addition, the foam pad is a consumption material, an elastic deformation will be caused after the conventional game grip is used for a long time. As a result, the conventional game grip has an unstable structure and a higher manufacturing cost.

Thus, it is essential to provide an innovative game grip having a stabler structure and a lower manufacturing cost, and the innovative game grip is different from the conventional game grip.

SUMMARY OF THE INVENTION

An object of the present invention is to provide a game grip. The game grip includes a cover body, a grip shell, a pressure sensor, a buffer material element, a sliding mechanism and an elastic mechanism. An outer surface of the cover body is recessed inward to form an accommodating surface. The grip shell is covered to the accommodating surface of the cover body. The pressure sensor is disposed to the accommodating surface of the cover body. The buffer material element is disposed to the grip shell. The buffer material element is disposed corresponding to the pressure sensor. The sliding mechanism is disposed between the cover body and the grip shell. The elastic mechanism abuts between the accommodating surface of the cover body and the grip shell. When the grip shell is without being exerted by an external force, the buffer material element is spaced from the pressure sensor to form an interstice between the buffer material element and the pressure sensor, when the grip shell is exerted by the external force, the grip shell approaches the cover body and drives the buffer material element to contact the pressure sensor by virtue of the sliding mechanism.

Another object of the present invention is to provide a game grip. The game grip includes a lower cover, an upper cover, a grip shell covered to the accommodating surface, a sensing structure disposed to an inner surface of the grip shell, a pressure sensor disposed to the accommodating surface, a buffer material element, a sliding mechanism, an elastic mechanism. One side of an outer surface of the lower cover is recessed inward to form a first concave surface. The upper cover is mounted with the lower cover. An outer surface of the upper cover is recessed inward to form a second concave surface. The first concave surface and the second concave surface are connected to form an accommodating surface. The buffer material element is disposed to the grip shell. The buffer material element is disposed corresponding to the pressure sensor. The sliding mechanism is disposed among the lower cover, the upper cover and the grip shell. The elastic mechanism abuts between the accommodating surface and the grip shell. When the grip shell is without being exerted by an external force, the buffer material element is spaced from the pressure sensor, when the grip shell is exerted by the external force, the grip shell approaches the lower cover and the upper cover, and the grip shell drives the buffer material element to contact the pressure sensor by virtue of the sliding mechanism.

Another object of the present invention is to provide a game grip. The game grip includes a cover body, a grip shell, a pressure sensor, a buffer material element, a sliding mechanism and an elastic mechanism. The cover body includes a lower cover and an upper cover. One side of an outer surface of the lower cover is recessed inward to form a first concave surface. The upper cover is mounted with the lower cover. An outer surface of the upper cover is recessed inward to form a second concave surface. The first concave surface and the second concave surface are connected to form an accommodating surface. The grip shell is covered to the accommodating surface of the cover body. The pressure sensor is disposed to the accommodating surface of the cover body. The buffer material element is disposed to the grip shell. The buffer material element is disposed corresponding to the pressure sensor. The sliding mechanism is disposed between the cover body and the grip shell. The elastic mechanism abuts between the accommodating surface of the cover body and the grip shell. When the grip shell is without being exerted by an external force, the buffer material element is spaced from the pressure sensor, when the grip shell is exerted by the external force, the grip shell approaches the cover body and drives the buffer material element to contact the pressure sensor by virtue of the sliding mechanism.

As described above, when the grip shell is without being exerted by the external force, an elastic arm abuts against the grip shell to make a plurality of hooks hook and abut against a plurality of the blocking blocks to show an abutting status and a close status, the grip shell is without being pressed inward easily at the time of the game grip being operated in hand and being without being exerted by the external force, the buffer material element is located to an outside of the pressure sensor, the buffer material element is without contacting with the pressure sensor to form an interstice between the buffer material element and the pressure sensor, the buffer material element will be without contacting with the pressure sensor at the time of the game grip being operated in hand, when the grip shell is exerted by the external force, the elastic arm is sunk towards an inner side of a through-hole of the upper cover to make the plurality of the hooks break away from the plurality of the blocking blocks, the plurality of the rotation shafts are acted as shaft centers to slightly rotate to drive the buffer material element contact with the pressure sensor, the structure plane transfers the external force to the pressure sensor from the buffer material element together with the grip shell by virtue of the pressure sensor contacting with the buffer material element to sense a strength of the external force and feed the strength of the external force to a game, the grip shell is without being pressed inward easily at the time of the game grip being operated in hand and being without being exerted by the external force, the grip shell will be without touching the pressure sensor, nevertheless, after the game grip is exerted by the external force, the grip shell contacts with the elastic mechanisms of the upper cover, the sensing structure of the game grip is steady, and a foam pad is omitted so as to make the game grip has a lower manufacturing cost.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
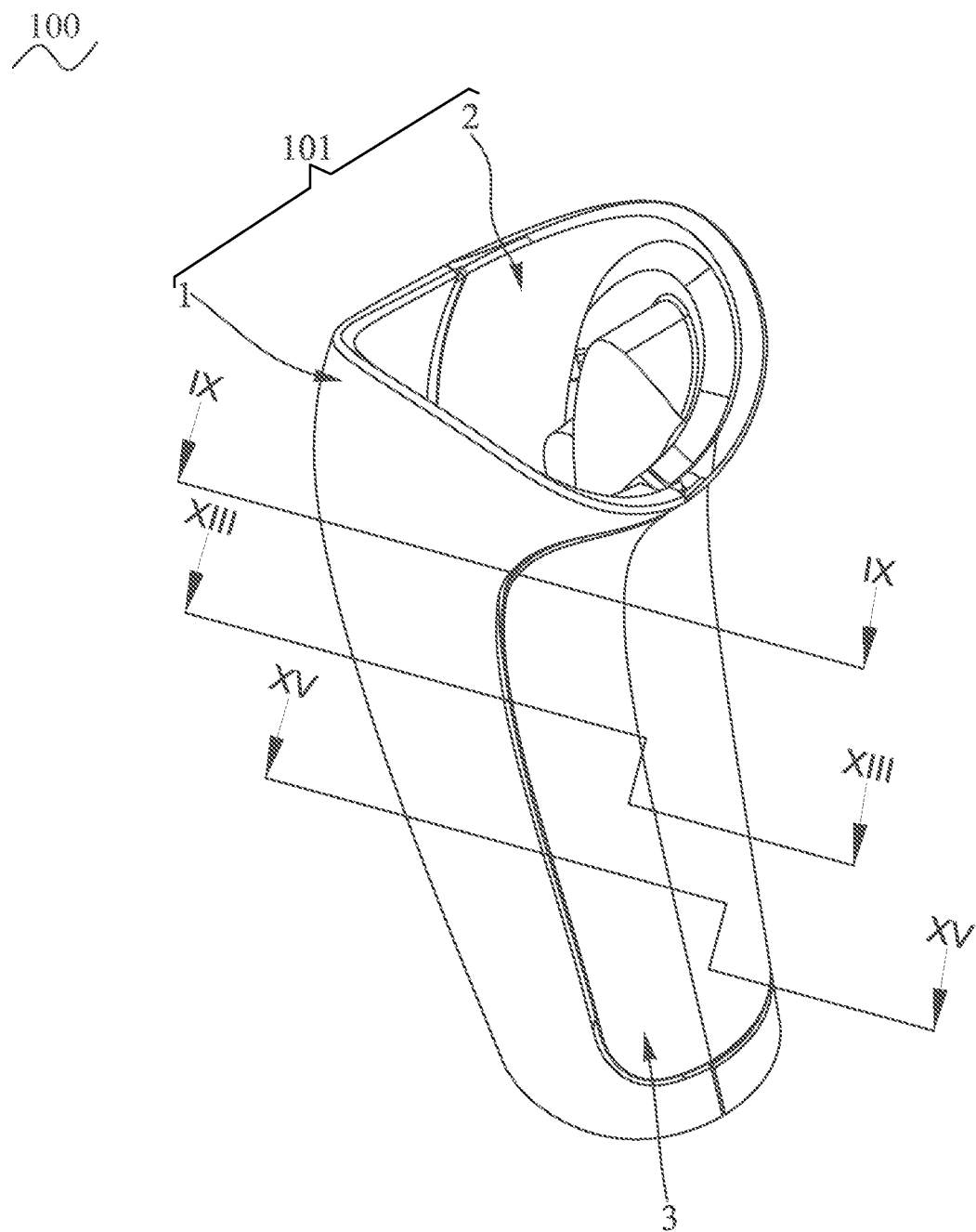
FIG. 1 is a perspective view of a game grip in accordance with a first preferred embodiment of the present invention.
Figure 2:
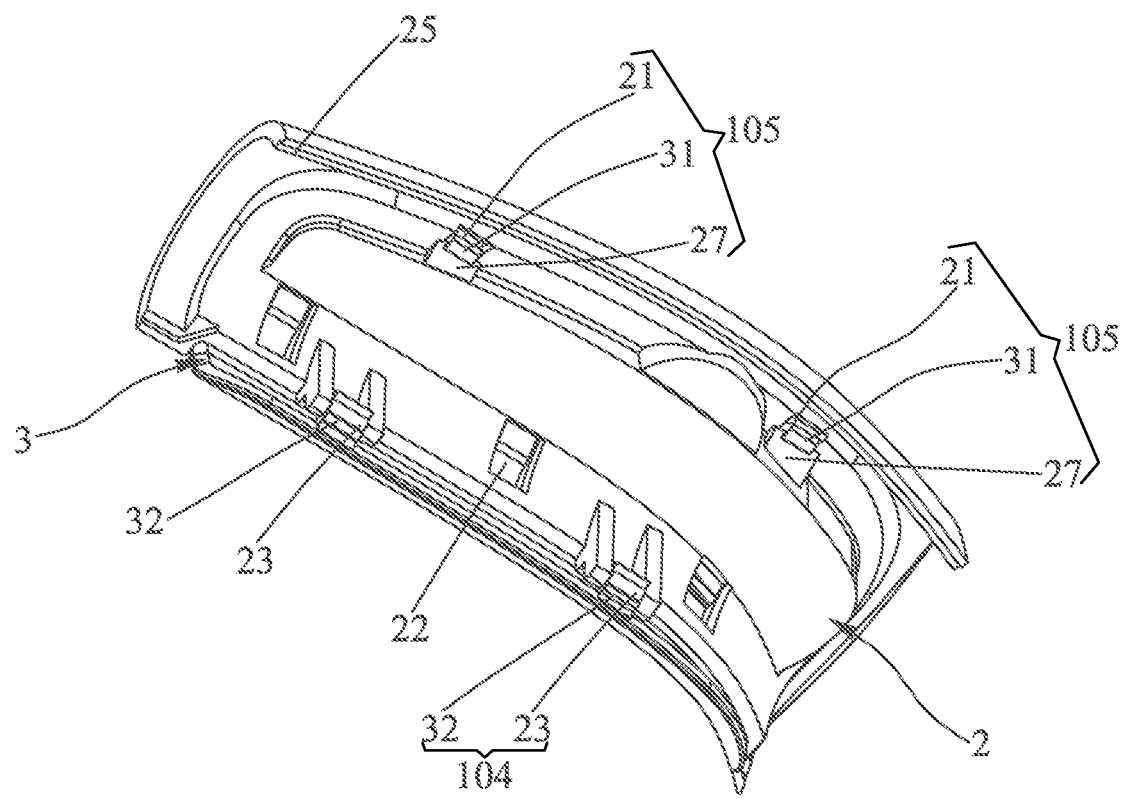
FIG. 2 is an assembling perspective view showing that an upper cover is assembled to a grip shell of the game grip of FIG. 1.

With reference to FIG. 1 to FIG. 10, a game grip 100 in accordance with a first preferred embodiment of the present invention is shown. The game grip 100 includes a cover body 101, a lower cover 1, an upper cover 2, a grip shell 3, a sensing structure 4 and a pressure sensor 5. The cover body 101 includes the lower cover 1, and the upper cover 2 mounted with the lower cover 1.

The lower cover 1 and the upper cover 2 are assembled to form the cover body 101. An outer surface of the cover body 101 is recessed inward to form an accommodating surface 102. The grip shell 3 is covered to the accommodating surface 102 of the cover body 101. The grip shell 3 is buckled to a junction connected between the lower cover 1 and the upper cover 2. In the first preferred embodiment, an assembling method of the grip shell 3, the lower cover 1 and the upper cover 2 is capable of decreasing assembling work time of the game grip 100. In the first preferred embodiment, the pressure sensor 5 is disposed to an outer surface of the upper cover 2. The pressure sensor 5 is disposed to the accommodating surface 102 of the cover body 101. The sensing structure 4 is disposed to an inner surface of the grip shell 3. A position of the sensing structure 4 is corresponding to the pressure sensor 5. A gap 103 is formed between the sensing structure 4 and the pressure sensor 5.

Figure 3:
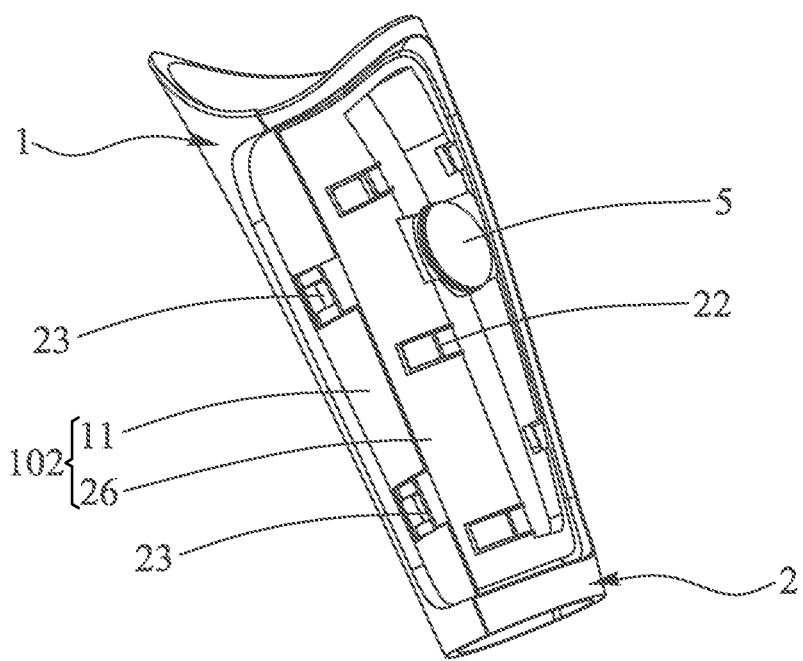
FIG. 3 is an assembling perspective view showing that the upper cover is assembled with the lower cover of the game grip of FIG. 2.
Figure 4:
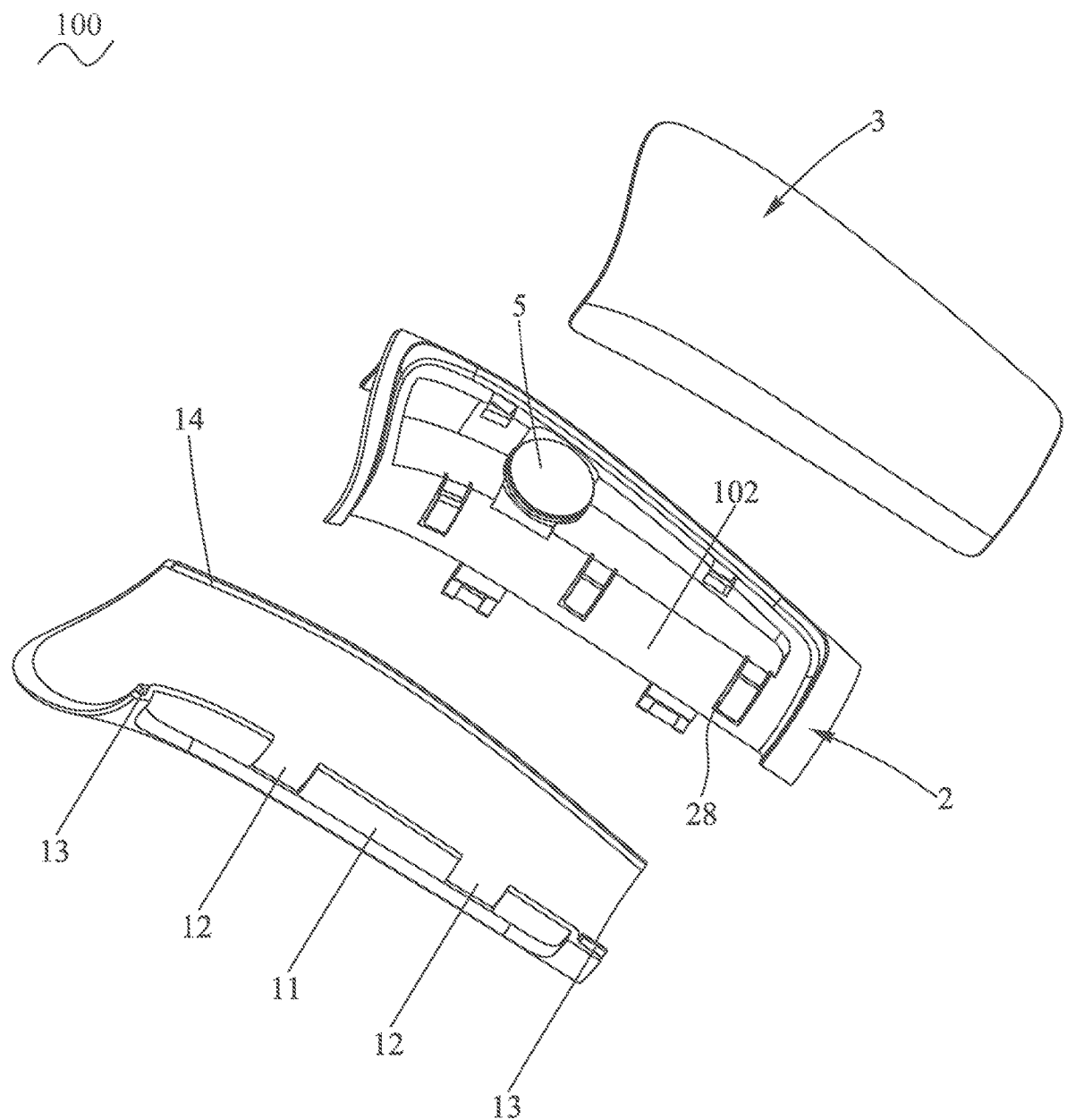
FIG. 4 is an exploded view of the game grip of FIG. 1.
Figure 5:
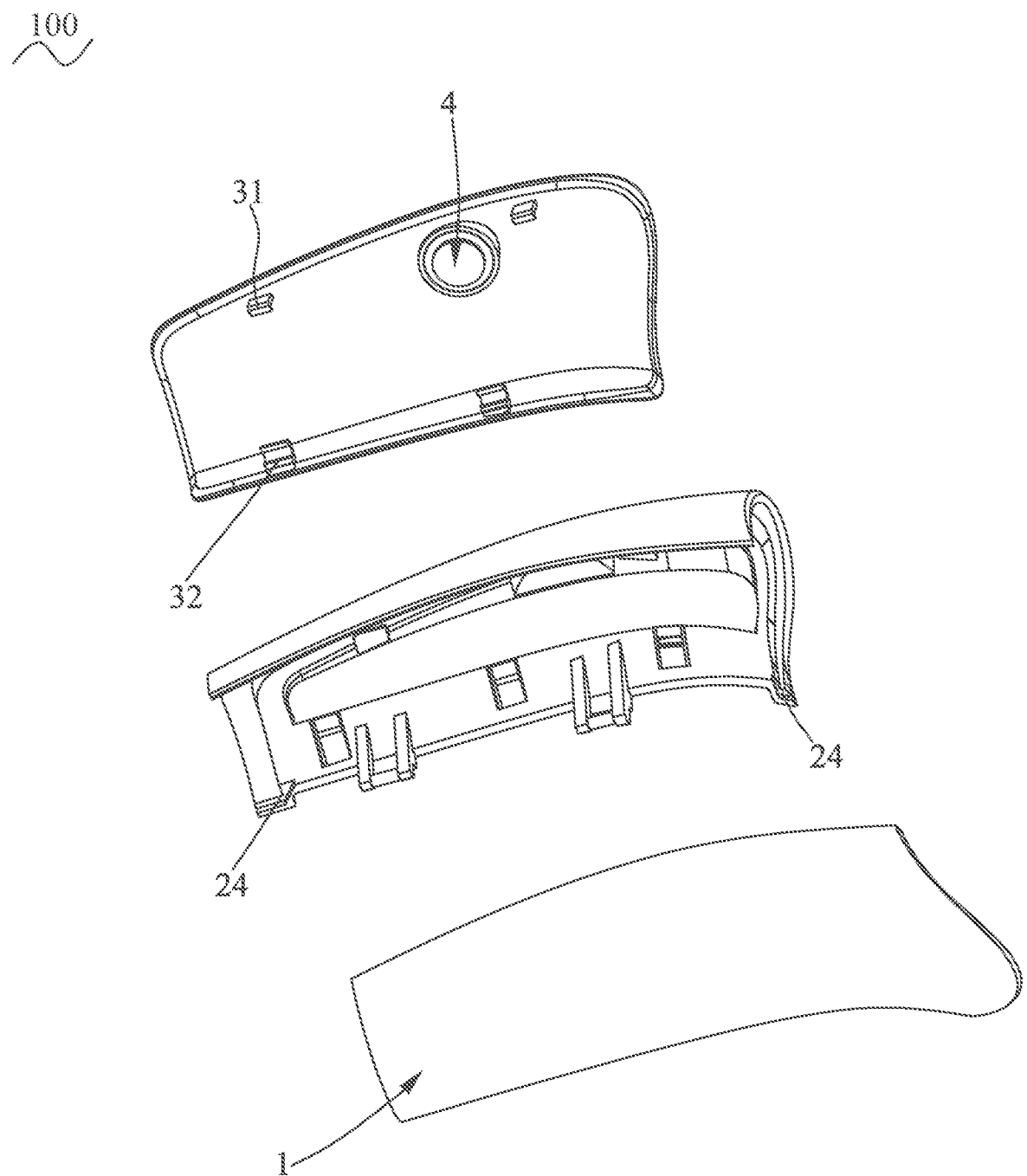
FIG. 5 is another exploded view of the game grip of FIG. 1.
Figure 6:
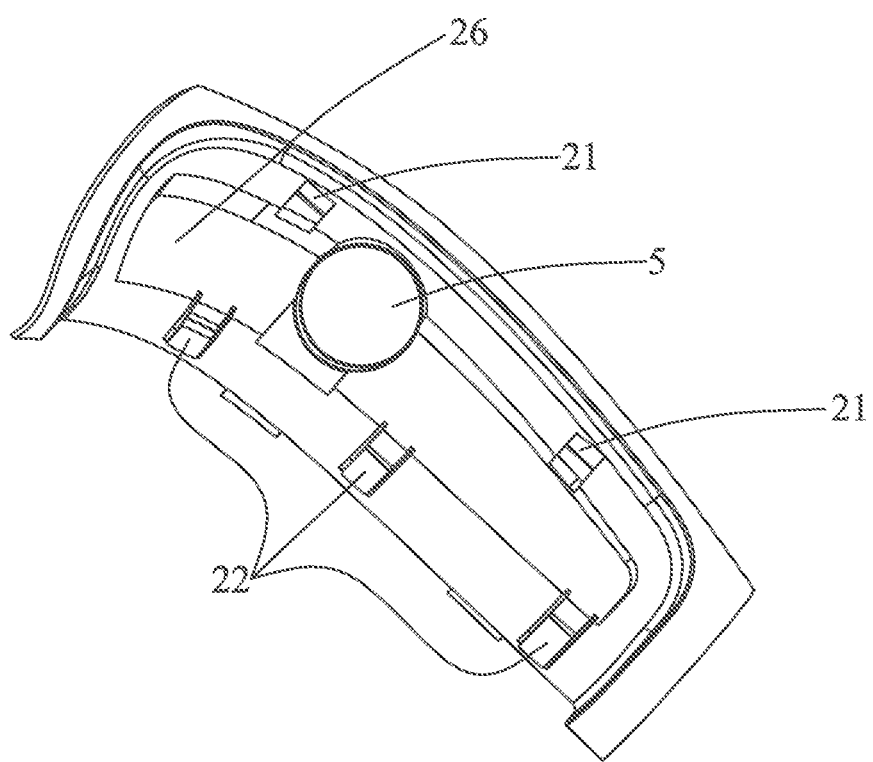
FIG. 6 is a diagrammatic drawing of the upper cover of the game grip in accordance with the present invention.
Figure 7:
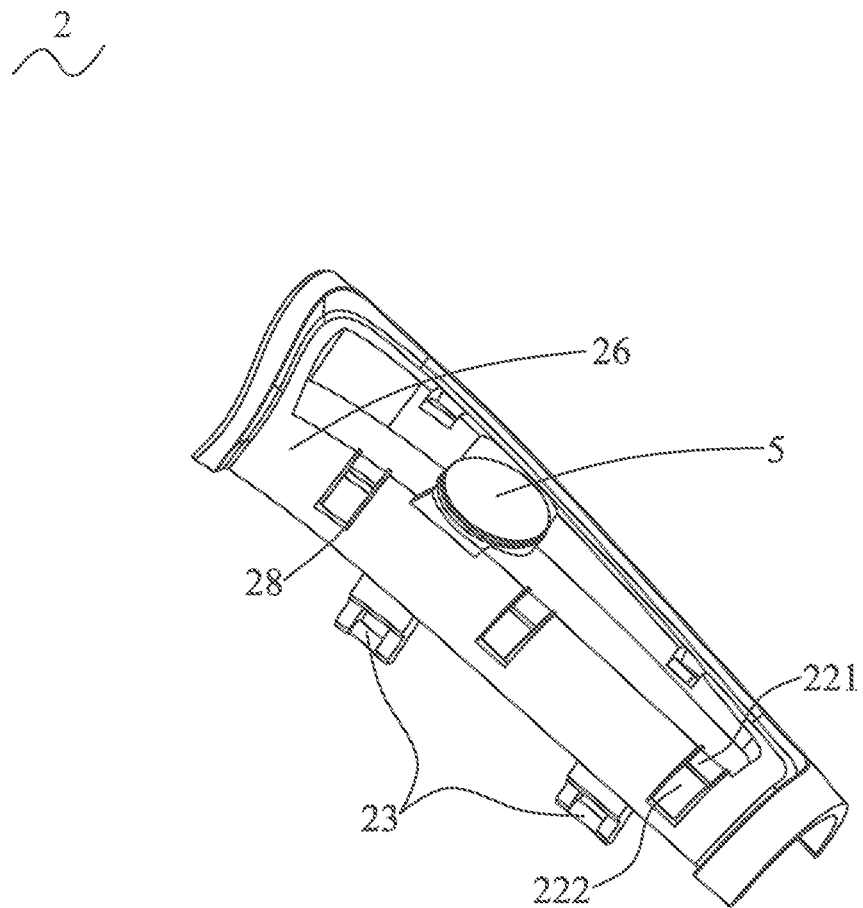
FIG. 7 is another diagrammatic drawing of the upper cover of the game grip in accordance with the present invention.
Figure 8:
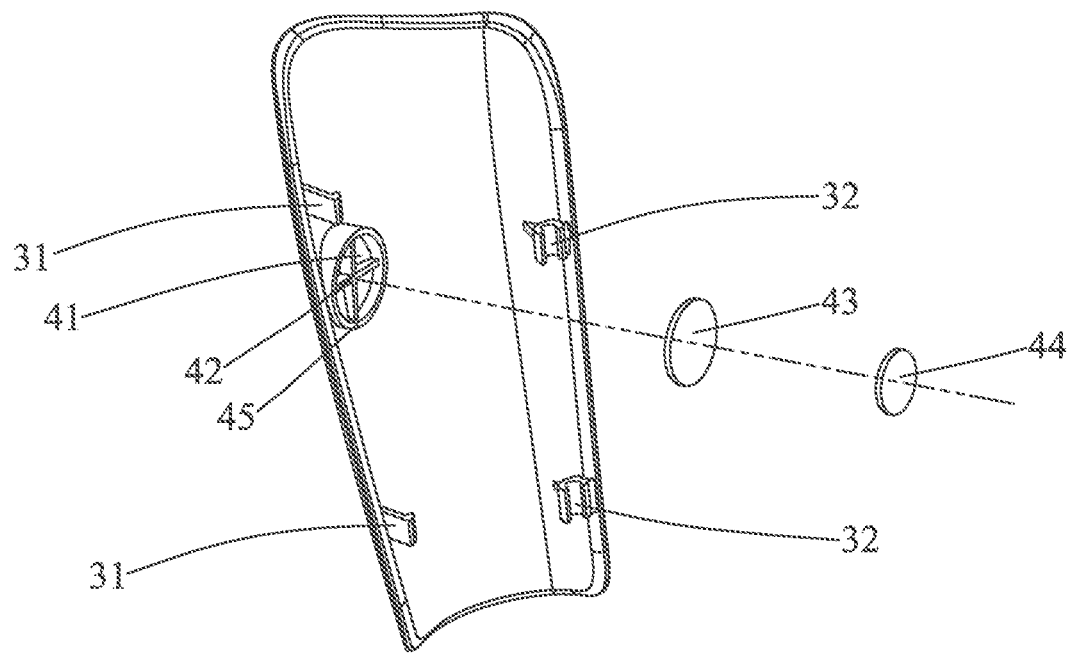
FIG. 8 is an exploded view of the grip shell of the game grip in accordance with the present invention.
Figure 9:
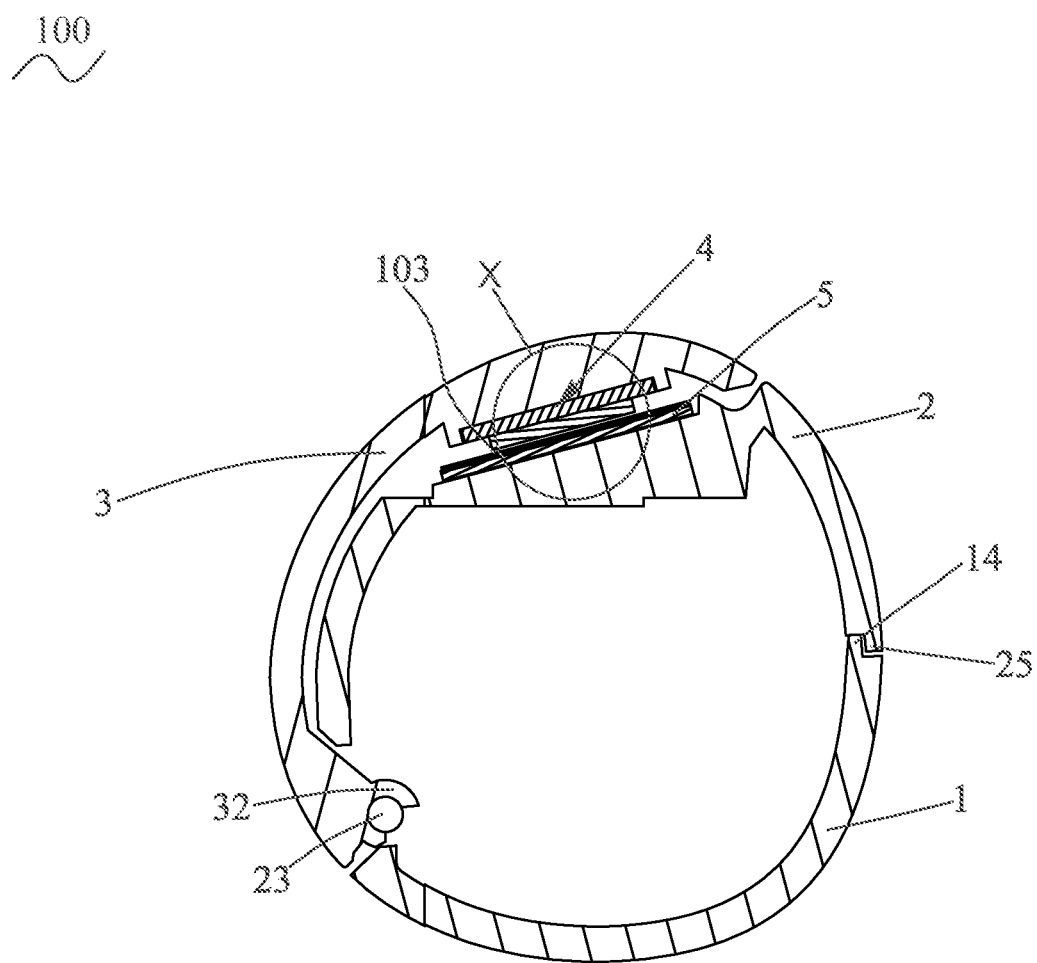
FIG. 9 is a sectional view of the game grip along a line IX-IX of FIG. 1.
Figure 10:
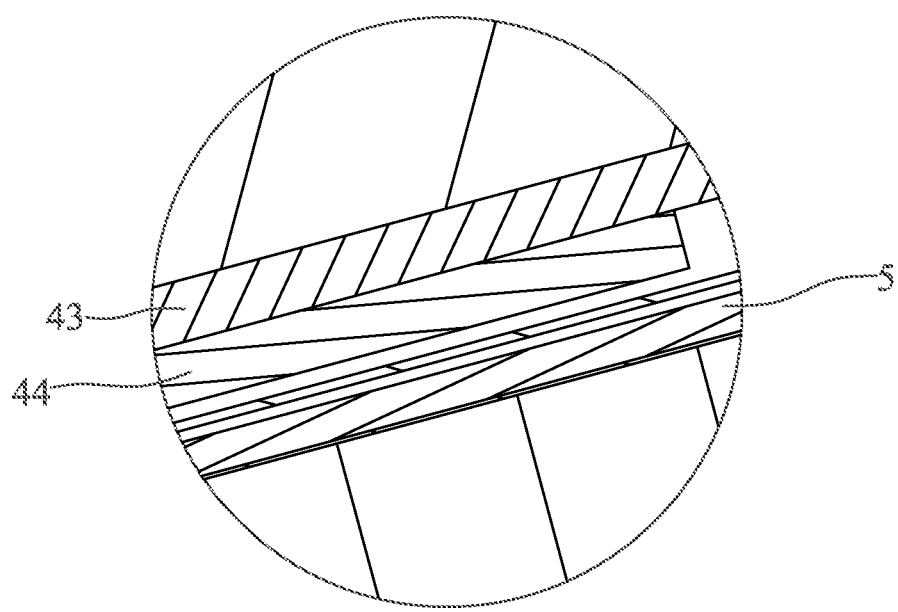
FIG. 10 is an enlarged view of an encircled portion X of the game grip of FIG. 9.
Figure 11:
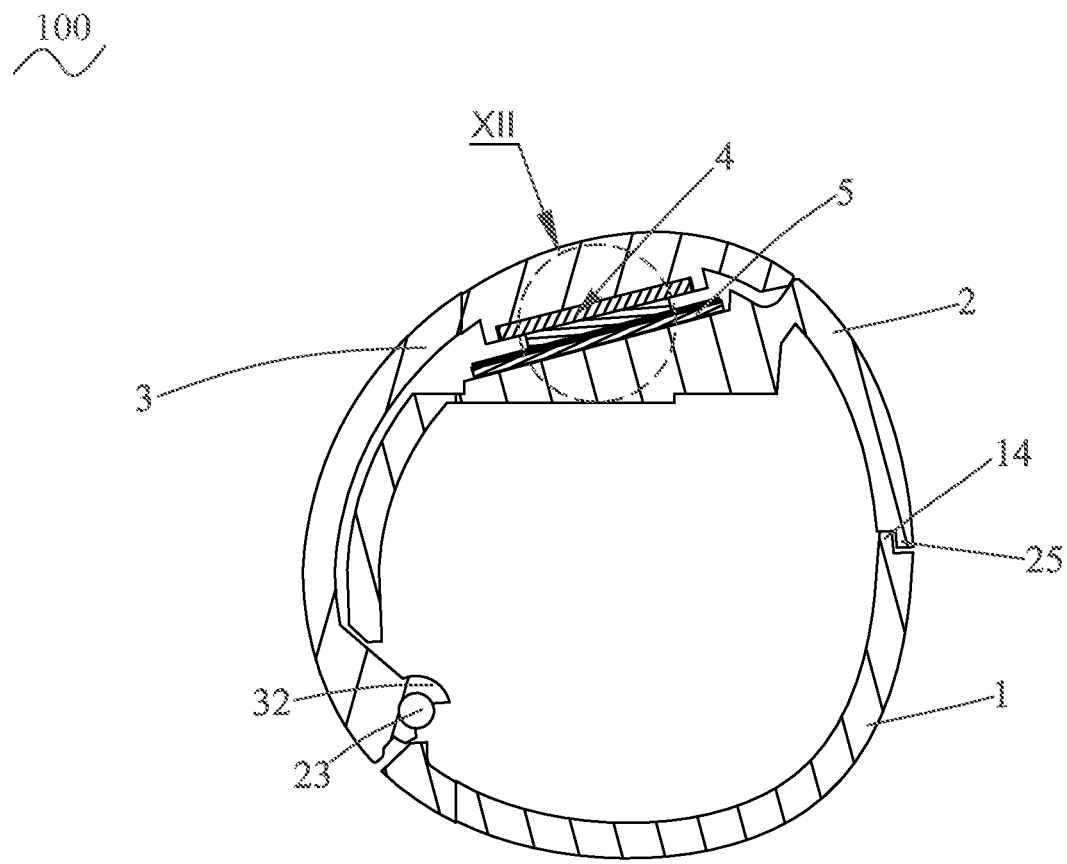
FIG. 11 is a diagrammatic drawing showing that an external force is exerted on the game grip of FIG. 9.
Figure 12:
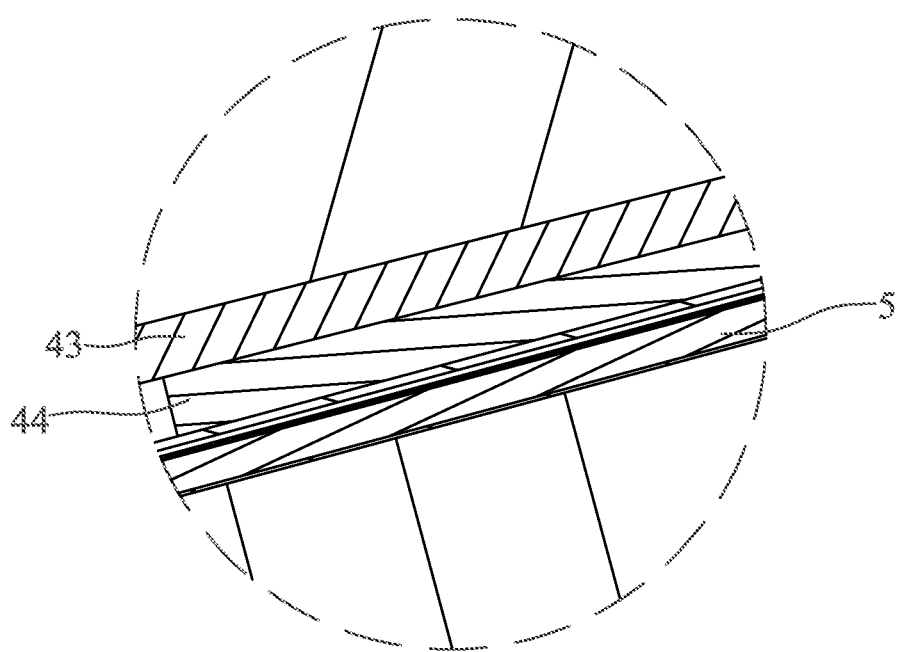
FIG. 12 is an enlarged view of an encircled portion XII of the game grip of FIG. 11.
Figure 13:
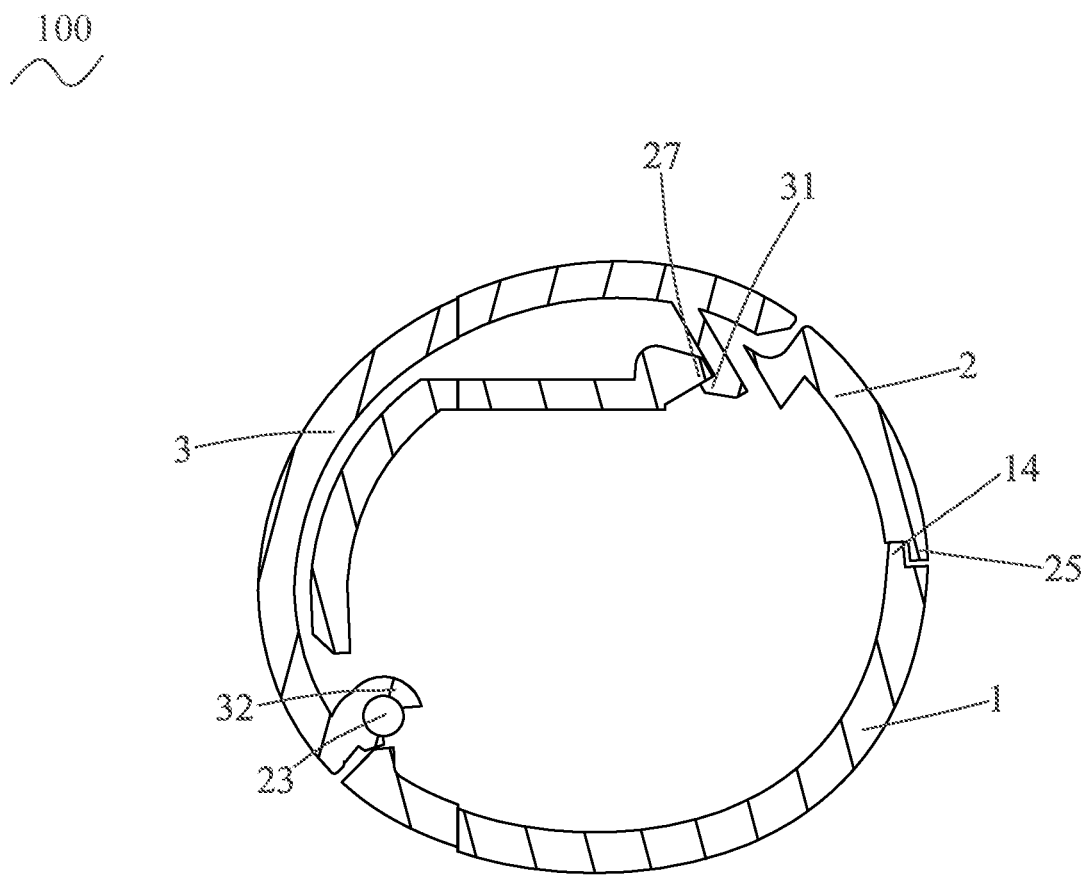
FIG. 13 is a sectional view of the game grip along a line XIII-XIII of FIG. 1.
Figure 14:
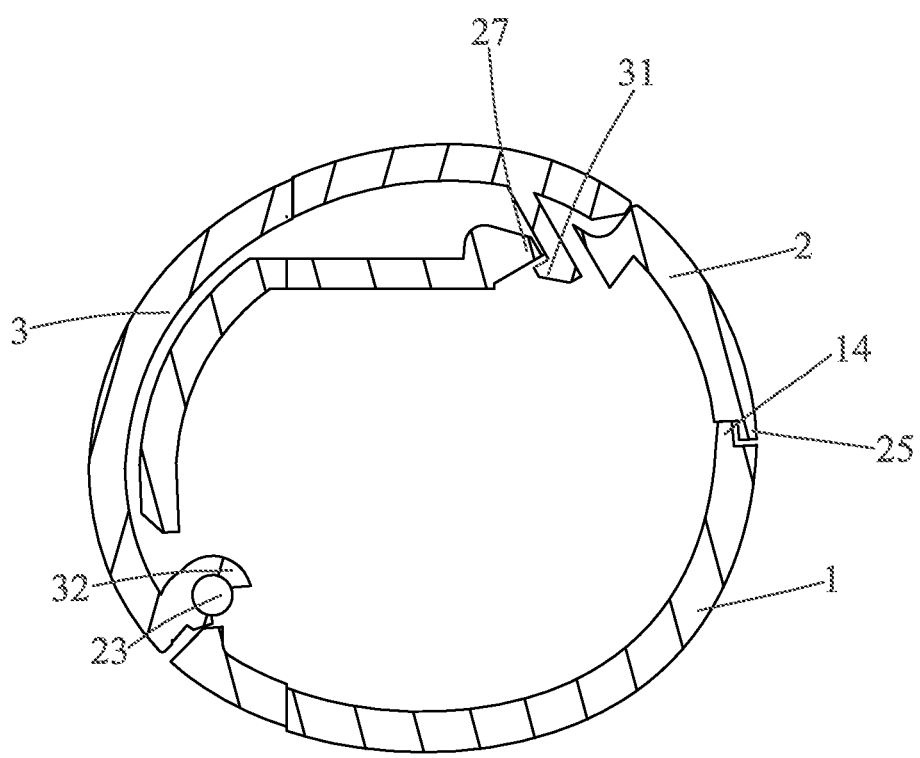
FIG. 14 is a diagrammatic drawing showing that the external force is exerted on the game grip of FIG. 13.

Referring to FIG. 3 and FIG. 4, the lower cover 1 has a first concave surface 11, a plurality of notches 12, at least two protruding blocks 13 and a first extending portion 14. An outer surface of one side of the lower cover 1 is recessed inward to form the first concave surface 11. The first concave surface 11 is used for receiving a part of the grip shell 3. An edge of the first concave surface 11 defines the plurality of the notches 12. The plurality of the notches 12 are disposed to the first concave surface 11. A corresponding mechanism of the upper cover 2 is fastened to the plurality of the notches 12 to realize locating and fixing the lower cover 1 with the upper cover 2. At least two portions of two opposite ends of the one side of the lower cover 1 extend outward to form the at least two protruding blocks 13. In the first preferred embodiment, the two opposite ends of the one side of the lower cover 1 extend outward to form two protruding blocks 13. The first concave surface 11 is disposed between the two protruding blocks 13. The at least two protruding blocks 13 are used for abutting against the corresponding mechanism of the upper cover 2 to realize locating and fixing the lower cover 1 with the upper cover 2. The other side of the lower cover 1 protrude outward to form the first extending portion 14 extending longitudinally. The first extending portion 14 is used for abutting against the corresponding mechanism of the upper cover 2 to realize locating and fixing the lower cover 1 with the upper cover 2.

Referring to FIG. 2 to FIG. 15, the upper cover 2 has a plurality of guiding holes 21, a plurality of elastic mechanisms 22, a plurality of rotation shafts 23, at least two recesses 24, a second extending portion 25 and a second concave surface 26. An outer surface of the upper cover 2 is recessed inward to form the second concave surface 26. The second concave surface 26 is used for receiving a part of the grip shell 3. After the upper cover 2 and the lower cover 1 are assembled, the second concave surface 26 is connected with the first concave surface 11. Several portions of the other side of the second concave surface 26 are recessed inward to form the plurality of the guiding holes 21. The plurality of the guiding holes 21 are perforations. An inner surface of the upper cover 2 has a plurality of blocking blocks 27 located to one side of the plurality of the guiding holes 21.

A corresponding mechanism of the grip shell 3 passes through the plurality of the guiding holes 21 and are buckled with the plurality of the blocking blocks 27 of the inner surface of the upper cover 2 to realize locating and fixing the upper cover 2 with the grip shell 3. A middle portion of the second concave surface 26 has a plurality of the elastic mechanisms 22. One end of each elastic mechanism 22 is connected with the upper cover 2. A bottom of each elastic mechanism 22 of the cover body 101 opens a through-hole 28 corresponding to the elastic arm 222. Each elastic mechanism 22 is of a cantilever arm type. Each elastic mechanism 22 has a fastening arm 221 and an elastic arm 222. One end of the fastening arm 221 of each elastic mechanism 22 is connected with the upper cover 2 of the cover body 101. The other end of the fastening arm 221 extends outward to form the elastic arm 222. The elastic arm 222 is disposed to one side of the through-hole 28. The elastic arm 222 is used for abutting against the grip shell 3. Each elastic mechanism 22 abuts between the accommodating surface 102 of the cover body 101 and the grip shell 3.

Figure 15:
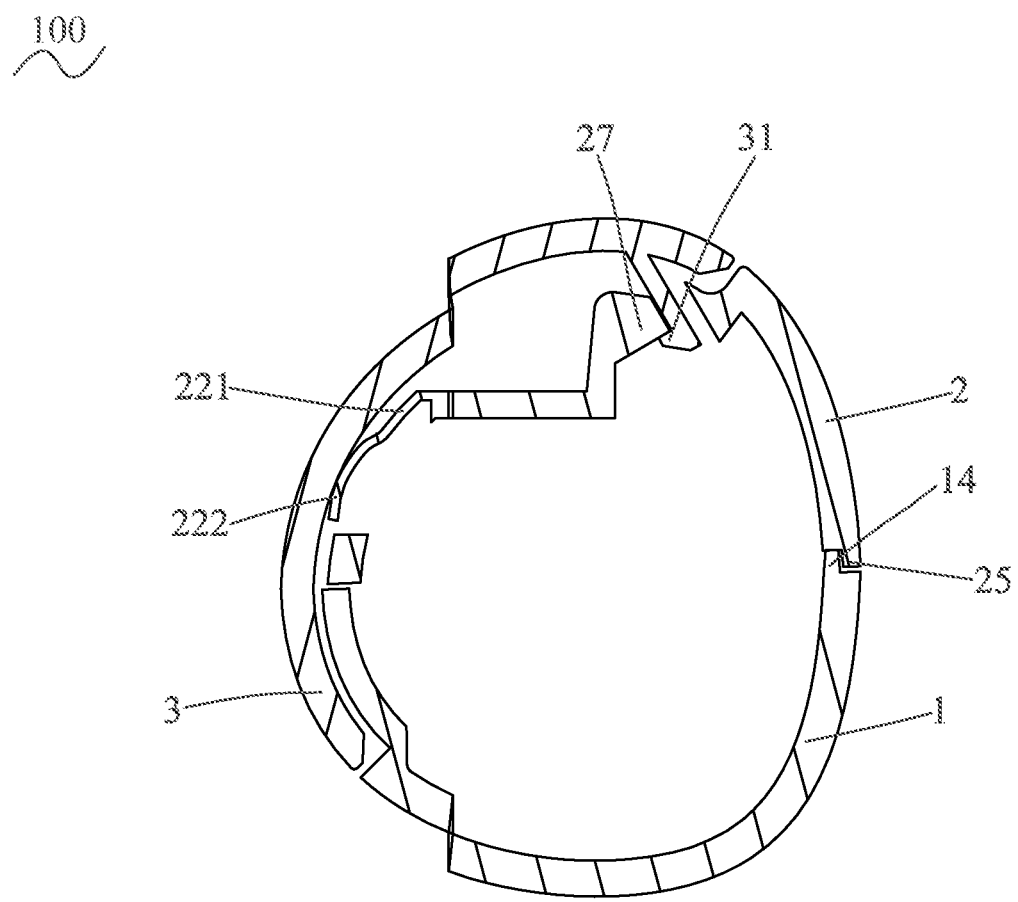
FIG. 15 is a sectional view of the game grip along a line XV-XV of FIG. 1.

Referring to FIG. 15, when the game grip 100 is without being exerted by an external force, the elastic arm 222 abuts against the grip shell 3 to make the grip shell 3 without being pressed inward and towards the pressure sensor 5 easily at the time of the game grip 100 being operated in hand, the grip shell 3 is without contacting with the upper cover 2. When the game grip 100 is exerted by the external force, the elastic arm 222 is sunk towards an inner side of the through-hole 28 of the upper cover 2. After the game grip 100 is exerted by the external force, the grip shell 3 contacts with the upper cover 2. One side of the upper cover 2 is equipped with a plurality of rotation shafts 23. The plurality of the rotation shafts 23 are disposed to one side of the second concave surface 26. The plurality of the rotation shafts 23 are fastened in the plurality of the notches 12 to realize locating and fixing the upper cover 2 with the lower cover 1. The plurality of the rotation shafts 23 are used for being buckled with the corresponding mechanism of the grip shell 3 to realize fixing and locating the upper cover 2 with the grip shell 3.

When the external force is exerted on the game grip 100, the plurality of the rotation shafts 23 are acted as shaft centers to slightly rotate to drive the grip shell 3 contact with the upper cover 2. At least two portions of two ends of one side of the upper cover 2 are recessed inward to form the at least two recesses 24. The two ends of the one side of the upper cover 2 are recessed inward to form two recesses 24. The plurality of the rotation shafts 23 are located between the two recesses 24. The at least two protruding blocks 13 abut against inner walls of the at least two recesses 24 to realize fixing and locating the upper cover 2 with the lower cover 1. An outer side of the other side of the upper cover 2 protrudes outward and extends longitudinally to form the second extending portion 25. The second extending portion 25 abuts against the first extending portion 14 to realize locating and fixing the upper cover 2 with the lower cover 1. A top surface of the second concave surface 26 is equipped with the pressure sensor 5. The pressure sensor 5 is used for sensing a strength of the external force and feeding the strength of the external force to a game.

Referring to FIG. 2 to FIG. 8, the grip shell 3 is buckled to a space which is formed by connecting the first concave surface 11 with the second concave surface 26. In the first preferred embodiment, the first concave surface 11 and the second concave surface 26 are connected to form the accommodating surface 102. The inner surface of the grip shell 3 has a plurality of hooks 31 and a plurality of buckling portions 32. The sensing structure 4 includes an accommodating groove 41, a rib 42, a structure plane 43, a buffer material element 44 and a hollow location pillar 45. The structure plane 43 is disposed between the grip shell 3 and the buffer material element 44. Several portions of one side of the inner surface of the grip shell 3 extend inward to form the plurality of the hooks 31. The plurality of the hooks 31 pass through the plurality of the guiding holes 21 and are buckled with the plurality of the blocking blocks 27 to realize locating and fixing the grip shell 3 with the upper cover 2. The other end of the inner surface of the grip shell 3 has the plurality of the buckling portions 32 disposed in alignment.

The plurality of the buckling portions 32 are fastened to the plurality of the rotation shafts 23 to realize locating and fixing the grip shell 3 with the upper cover 2. The inner surface of the grip shell 3 is equipped with the hollow location pillar 45 extending inward. The location pillar 45 and the plurality of the hooks 31 are located at one side, and the location pillar 45 is located among the plurality of the hooks 31. A middle of the location pillar 45 has the accommodating groove 41 surrounded by the location pillar 45. An inside of the accommodating groove 41 has the rib 42 extending towards an inside of the grip shell 3. The rib 42 has the structure plane 43. The structure plane 43 is positioned in the location pillar 45. The structure plane 43 is disposed in the accommodating groove 41 and covers the rib 42. The buffer material element 44 is disposed to the grip shell 3. The buffer material element 44 is disposed to the structure plane 43. The buffer material element 44 is exposed out of the location pillar 45. The buffer material element 44 is disposed corresponding to the pressure sensor 5. The buffer material element 44 is used for contacting with the pressure sensor 5 to sense the strength of the external force and feed the strength of the external force to the game.

Referring to FIG. 1 to FIG. 15, when the game grip 100 is without being exerted by the external force, the elastic arm 222 of each elastic mechanism 22 abuts against the grip shell 3 to make the plurality of the hooks 31 hook the plurality of the blocking blocks 27 to show an abutting status, the grip shell 3 is without being pressed inward and towards the pressure sensor 5 easily at the time of the game grip 100 being operated in hand, the buffer material element 44 is located to an outside of the pressure sensor 5, the buffer material element 44 is without contacting with the pressure sensor 5, and the buffer material element 44 is spaced from the pressure sensor 5 to form an interstice between the buffer material element 44 and the pressure sensor 5, at the moment, the buffer material element 44 will be without contacting with the pressure sensor 5 at the time of the game grip 100 being operated in hand.

When the grip shell 3 of the game grip 100 is exerted by the external force, the elastic arm 222 is sunk towards the inner side of the through-hole 28 of the upper cover 2 to make the plurality of the hooks 31 break away from the plurality of the blocking blocks 27. The plurality of the rotation shafts 23 are acted as the shaft centers to slightly rotate to drive the buffer material element 44 contact with the pressure sensor 5. The structure plane 43 transfers the external force to the pressure sensor 5 from the buffer material element 44 together with the grip shell 3 by virtue of the pressure sensor 5 contacting with the buffer material element 44 to sense the strength of the external force and feed the strength of the external force to the game. In practice, the plurality of the elastic mechanisms 22 are disposed to the grip shell 3, when the elastic mechanisms 22 are disposed to the grip shell 3, the plurality of the elastic mechanisms 22 are capable of abutting against the accommodating surface 102 of the cover body 101. Moreover, in practice, positions of the plurality of the buckling portions 32 and the plurality of the rotation shafts 23 are capable of being exchanged. The plurality of the buckling portions 32 are capable of being disposed to the cover body 101. The plurality of the rotation shafts 23 are capable of being disposed to the grip shell 3. The game grip 100 further includes a rotation shaft mechanism 104. The plurality of the buckling portions 32 and the plurality of the rotation shafts 23 are assembled to the rotation shaft mechanism 104. The plurality of the guiding holes 21, the plurality of the blocking blocks 27 and the plurality of the hooks 31 are assembled to form a sliding mechanism 105. The grip shell 3 is capable of moving a little to approach the cover body 101 or moving a little to keep away from the cover body 101 by virtue of the rotation shaft mechanism 104 and the sliding mechanism 105.

The sliding mechanism 105 is disposed to one side of the accommodating surface 102 and one side of the grip shell 3. The grip shell 3 approaches the lower cover 1 and the upper cover 2 of the cover body 101, and the grip shell 3 drives the buffer material element 44 to contact the pressure sensor 5 by virtue of the sliding mechanism 105. The sliding mechanism 105 is disposed between the cover body 101 and the grip shell 3. The sliding mechanism 105 is disposed among the lower cover 1, the upper cover 2 and the grip shell 3. The rotation shaft mechanism 104 is disposed between the cover body 101 and the grip shell 3. The rotation shaft mechanism 104 is disposed to the other side of the accommodating surface 102 and the other side of the grip shell 3. The sliding mechanism 105 has at least one hook 31 disposed to the one side of the grip shell 3, and at least one guiding hole 21 disposed to the one side of the accommodating surface 102. The rotation shaft mechanism 104 includes at least one buckling portion 32 disposed at the other side of the grip shell 3, and at least one rotation shaft 23 disposed at the other side of the accommodating surface.

As described above, when the grip shell 3 of the game grip 100 is without being exerted by the external force, the elastic arm 222 abuts against the grip shell 3 to make the plurality of the hooks 31 hook and abut against the plurality of the blocking blocks 27 to show the abutting status and a close status, the grip shell 3 is without being pressed inward easily at the time of the game grip 100 being operated in hand and being without being exerted by the external force, the buffer material element 44 is located to the outside of the pressure sensor 5, the buffer material element 44 is without contacting with the pressure sensor 5 to form the interstice between the buffer material element 44 and the pressure sensor 5, the buffer material element 44 will be without contacting with the pressure sensor 5 at the time of the game grip 100 being operated in hand, when the grip shell 3 of the game grip 100 is exerted by the external force, the elastic arm 222 is sunk towards the inner side of the through-hole 28 of the upper cover 2 to make the plurality of the hooks 31 break away from the plurality of the blocking blocks 27, the plurality of the rotation shafts 23 are acted as the shaft centers to slightly rotate to drive the buffer material element 44 contact with the pressure sensor 5, the structure plane 43 transfers the external force to the pressure sensor 5 from the buffer material element 44 together with the grip shell 3 by virtue of the pressure sensor 5 contacting with the buffer material element 44 to sense the strength of the external force and feed the strength of the external force to the game, the grip shell 3 is without being pressed inward easily at the time of the game grip 100 being operated in hand and being without being exerted by the external force, the grip shell 3 will be without touching the pressure sensor 5, nevertheless, after the game grip 100 is exerted by the external force, the grip shell 3 contacts with the elastic mechanisms 22 of the upper cover 2, the sensing structure 4 of the game grip 100 is steady, and a foam pad is omitted so as to make the game grip 100 has a lower manufacturing cost.

What is claimed is:

1. A game grip, comprising:
   a cover body, an outer surface of the cover body being recessed inward to form an accommodating surface;
   a grip shell covered to the accommodating surface of the cover body;
   a pressure sensor disposed to the accommodating surface of the cover body;
   a buffer material element disposed to the grip shell, the buffer material element being disposed corresponding to the pressure sensor;
   a sliding mechanism disposed between the cover body and the grip shell; and
   an elastic mechanism abutting between the accommodating surface of the cover body and the grip shell,
   wherein when the grip shell is without being exerted by an external force, the buffer material element is spaced from the pressure sensor to form an interstice between the buffer material element and the pressure sensor, when the grip shell is exerted by the external force, the grip shell approaches the cover body and drives the buffer material element to contact the pressure sensor by virtue of the sliding mechanism.

2. The game grip as claimed in claim 1, further comprising a structure plane, the structure plane being disposed between the grip shell and the buffer material element.

3. The game grip as claimed in claim 2, wherein an inner surface of the grip shell is equipped with a hollow location pillar, a middle of the location pillar has an accommodating groove surrounded by the location pillar, an inside of the accommodating groove has a rib, the structure plane is disposed in the accommodating groove and covers the rib.

4. The game grip as claimed in claim 1, further comprising a rotation shaft mechanism, the rotation shaft mechanism being disposed between the cover body and the grip shell.

5. The game grip as claimed in claim 4, wherein the sliding mechanism is disposed to one side of the accommodating surface and one side of the grip shell, the rotation shaft mechanism is disposed to the other side of the accommodating surface and the other side of the grip shell.

6. The game grip as claimed in claim 5, wherein the sliding mechanism has at least one hook disposed to the one side of the grip shell, and at least one guiding hole disposed to the one side of the accommodating surface.

7. The game grip as claimed in claim 6, wherein the rotation shaft mechanism includes at least one buckling portion disposed at the other side of the grip shell, and at least one rotation shaft disposed at the other side of the accommodating surface.

8. The game grip as claimed in claim 1, wherein each elastic mechanism has a fastening arm and an elastic arm, one end of the fastening arm of each elastic mechanism is connected with the cover body, the other end of the fastening arm extends outward to form the elastic arm.

9. The game grip as claimed in claim 8, wherein a bottom of each elastic mechanism of the cover body opens a through-hole corresponding to the elastic arm.

10. The game grip as claimed in claim 1, wherein the cover body includes a lower cover and an upper cover, the lower cover has a first concave surface, a plurality of notches, at least two protruding blocks and a first extending portion, an outer surface of one side of the lower cover is recessed inward to form the first concave surface, an edge of the first concave surface defines the plurality of the notches disposed to the first concave surface, at least two portions of two opposite ends of the one side of the lower cover extend outward to form the at least two protruding blocks, the other side of the lower cover protrudes outward to form the first extending portion extending longitudinally, the upper cover has at least two recesses, a second extending portion and a second concave surface, an outer surface of the upper cover is recessed inward to form the second concave surface, the first concave surface and the second concave surface are connected to form the accommodating surface, at least two portions of two ends of one side of the upper cover are recessed inward to form the at least two recesses, the at least two protruding blocks abut against inner walls of the at least two recesses, an outer side of the other side of the upper cover protrudes outward and extends longitudinally to form the second extending portion, the second extending portion abuts against the first extending portion.

11. A game grip, comprising:
a lower cover, one side of an outer surface of the lower cover being recessed inward to form a first concave surface;
an upper cover mounted with the lower cover, an outer surface of the upper cover being recessed inward to form a second concave surface, the first concave surface and the second concave surface being connected to form an accommodating surface;
a grip shell covered to the accommodating surface;
a sensing structure disposed to an inner surface of the grip shell;
a pressure sensor disposed to the accommodating surface;
a buffer material element disposed to the grip shell, the buffer material element being disposed corresponding to the pressure sensor;
a sliding mechanism disposed among the lower cover, the upper cover and the grip shell; and
an elastic mechanism abutting between the accommodating surface and the grip shell,
wherein when the grip shell is without being exerted by an external force, the buffer material element is spaced from the pressure sensor, when the grip shell is exerted by the external force, the grip shell approaches the lower cover and the upper cover, and the grip shell drives the buffer material element to contact the pressure sensor by virtue of the sliding mechanism.

12. A game grip, comprising:
a cover body including
a lower cover, one side of an outer surface of the lower cover being recessed inward to form a first concave surface, and
an upper cover mounted with the lower cover, an outer surface of the upper cover being recessed inward to form a second concave surface, the first concave surface and the second concave surface being connected to form an accommodating surface;
a grip shell covered to the accommodating surface of the cover body;
a pressure sensor disposed to the accommodating surface of the cover body;
a buffer material element disposed to the grip shell, the buffer material element being disposed corresponding to the pressure sensor;
a sliding mechanism disposed between the cover body and the grip shell; and
an elastic mechanism abutting between the accommodating surface of the cover body and the grip shell,
wherein when the grip shell is without being exerted by an external force, the buffer material element is spaced from the pressure sensor, when the grip shell is exerted by the external force, the grip shell approaches the cover body and drives the buffer material element to contact the pressure sensor by virtue of the sliding mechanism.

* * * * *